(12) United States Patent
Seangly et al.

(10) Patent No.: US 11,659,312 B2
(45) Date of Patent: May 23, 2023

(54) EARPHONE WITH SOLID BODY

(71) Applicant: Audiolineout LLC, Portland, OR (US)

(72) Inventors: Valivann Seangly, Portland, OR (US); Ben Loeliger, Portland, OR (US); Kenneth Ball, Portland, OR (US); Caleb Rosenau, Portland, OR (US)

(73) Assignee: Audiolineout LLC, Portland, OR (US)

( * ) Notice: Subject to any disclaimer, the term of this patent is extended or adjusted under 35 U.S.C. 154(b) by 0 days.

(21) Appl. No.: 17/361,815

(22) Filed: Jun. 29, 2021

(65) Prior Publication Data

US 2022/0417634 A1 Dec. 29, 2022

Related U.S. Application Data

(63) Continuation of application No. 16/532,316, filed on Aug. 5, 2019, now abandoned.

(51) Int. Cl.
*H04R 1/10* (2006.01)
*G06F 30/10* (2020.01)
*H04R 31/00* (2006.01)

(52) U.S. Cl.
CPC ........... *H04R 1/1016* (2013.01); *G06F 30/10* (2020.01); *H04R 31/00* (2013.01)

(58) Field of Classification Search
CPC ...... H04R 1/02; H04R 1/1058; H04R 1/2884; H04R 1/26; H04R 1/1016; H04R 31/00; G06F 30/10
See application file for complete search history.

(56) References Cited

U.S. PATENT DOCUMENTS

| | | | |
|---|---|---|---|
| 9,706,285 B2 | 7/2017 | Lamb et al. | |
| 10,142,735 B2 | 11/2018 | Jan | |
| 2004/0252854 A1* | 12/2004 | Juneau | C07H 19/16 381/322 |
| 2011/0058702 A1* | 3/2011 | Saggio, Jr. | H04R 1/1016 381/380 |
| 2011/0255723 A1* | 10/2011 | Obradovic | H04R 25/652 381/328 |
| 2012/0008808 A1 | 1/2012 | Saltykov | |
| 2013/0251161 A1 | 9/2013 | Lott | |
| 2015/0030196 A1 | 1/2015 | Basseas | |

(Continued)

OTHER PUBLICATIONS

Chen et al., "3D Printing of Ceramics: A Review," *Journal of the European Ceramic Society*, 39 (2019), pp. 661-687.

(Continued)

*Primary Examiner* — Angelica M McKinney
(74) *Attorney, Agent, or Firm* — Klarquist Sparkman, LLP

(57) ABSTRACT

In an embodiment, an earphone having a solid earphone body is provided. A first mounting recess is formed in a first end of the earphone body. A first acoustic driver is disposed in the first mounting recess. At least a first sound bore is formed in the solid earphone body. The at least a first sound bore fluidly communicates with the first mounting recess and a first exit port formed at a second end of the earphone body. The second end of the earphone body is configured to be placed in an ear canal of a user. The earphone can be fabricated by a method that includes defining negative spaces for the first acoustic driver and the at least a first sound bore in a virtual model of the earphone body.

7 Claims, 8 Drawing Sheets

(56) References Cited

U.S. PATENT DOCUMENTS

| | | | |
|---|---|---|---|
| 2017/0238085 A1* | 8/2017 | Ball | H04R 29/001 |
| | | | 381/353 |
| 2018/0288513 A1* | 10/2018 | Ball | H04R 1/1016 |
| 2019/0208307 A1 | 7/2019 | Ogut et al. | |
| 2020/0322711 A1* | 10/2020 | Ogut | H04R 25/652 |
| 2021/0044879 A1* | 2/2021 | Seangly | H04R 31/006 |

OTHER PUBLICATIONS

Audio System, 3D Scanners and CAD/CAM for Shells, Ear Moulds and Casts, retrieved from: https://ww2.3shape.com/en/products/audio-system, visited on Aug. 5, 2019, 6 pages.

EarMouldDesigner™, retrieved from htttps://ww2.3shape.com/en/products/audio-system, visited on Aug. 5, 2019, 3 pages.

Non-Final Office Action received in U.S. Appl. No. 16/532,316, filed Jul. 31, 2020, 19 pages.

Final Office Action received in U.S. Appl. No. 16/532,316, filed Dec. 31, 2020, 27 pages.

\* cited by examiner

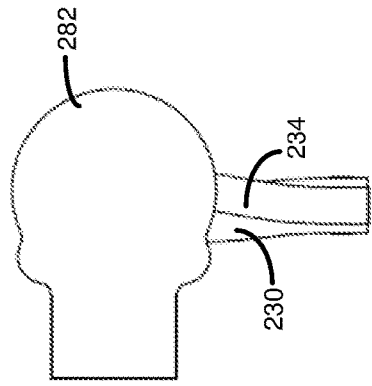
FIG. 2D
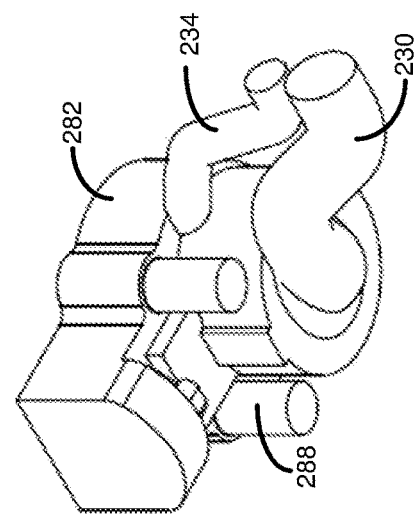
FIG. 2C
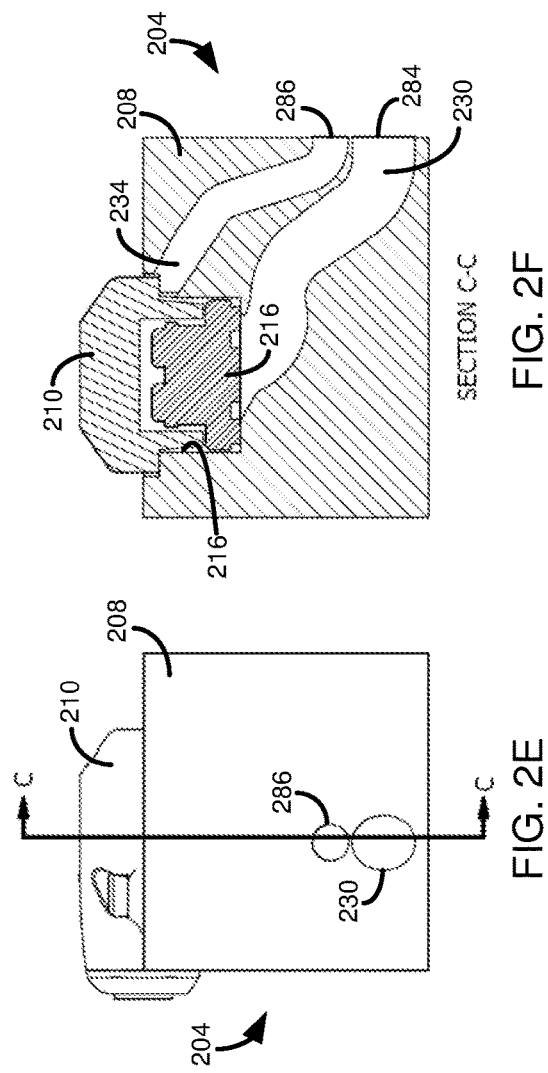
FIG. 2F
FIG. 2E

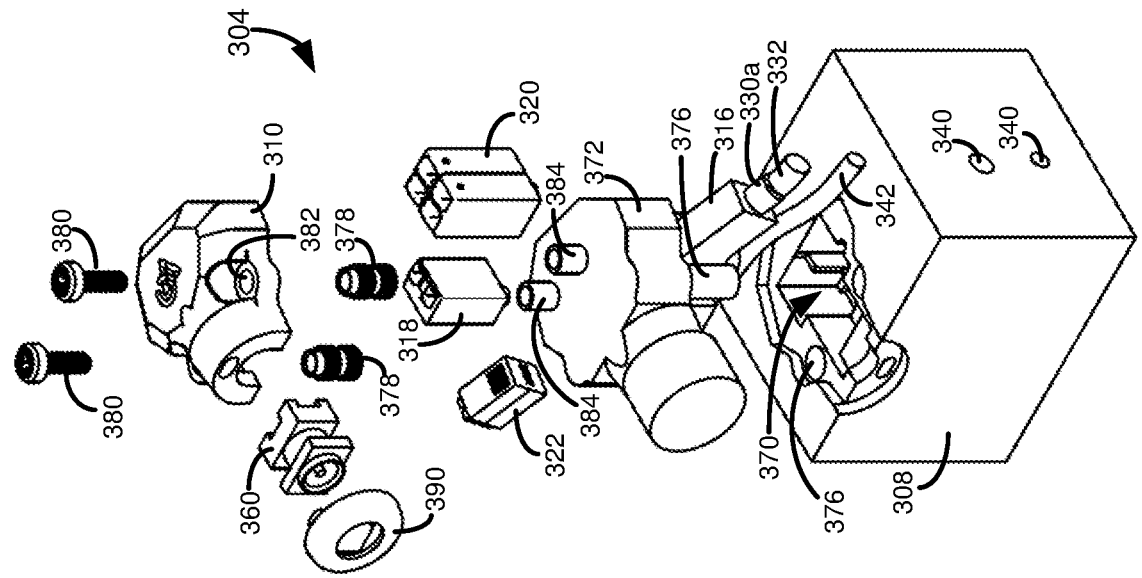
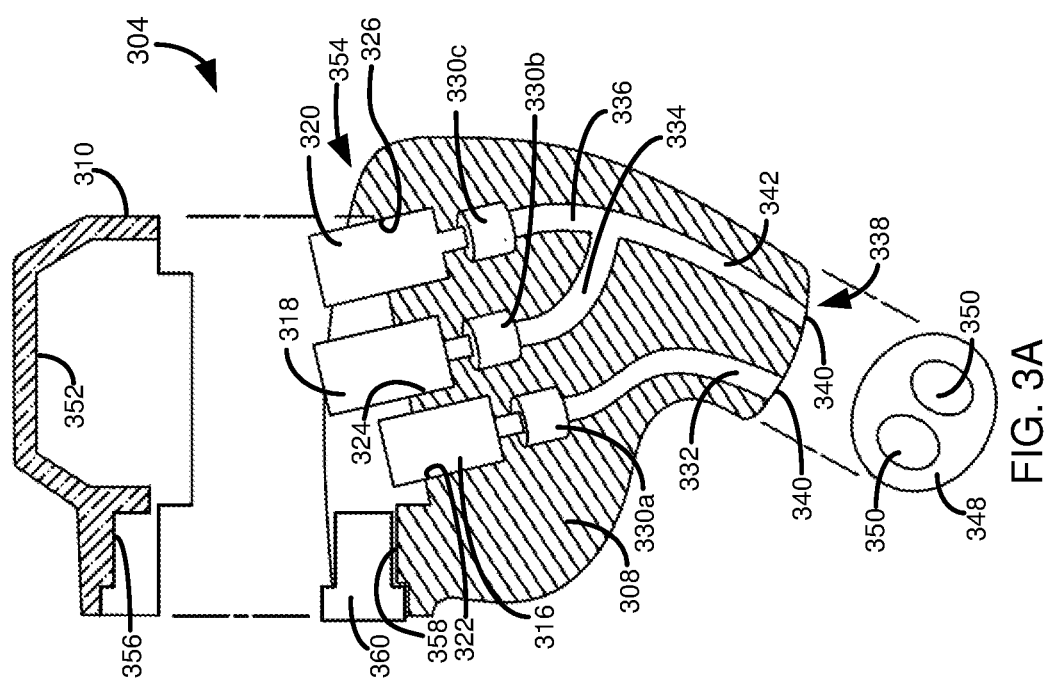
FIG. 3B
FIG. 3A

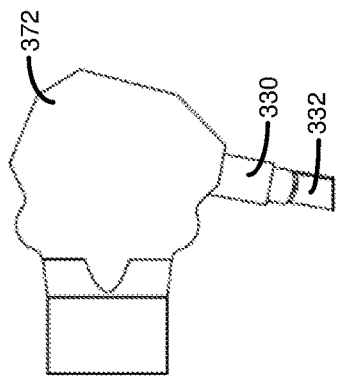
FIG. 3D
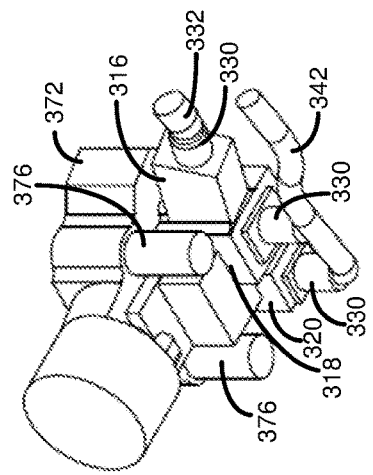
FIG. 3C
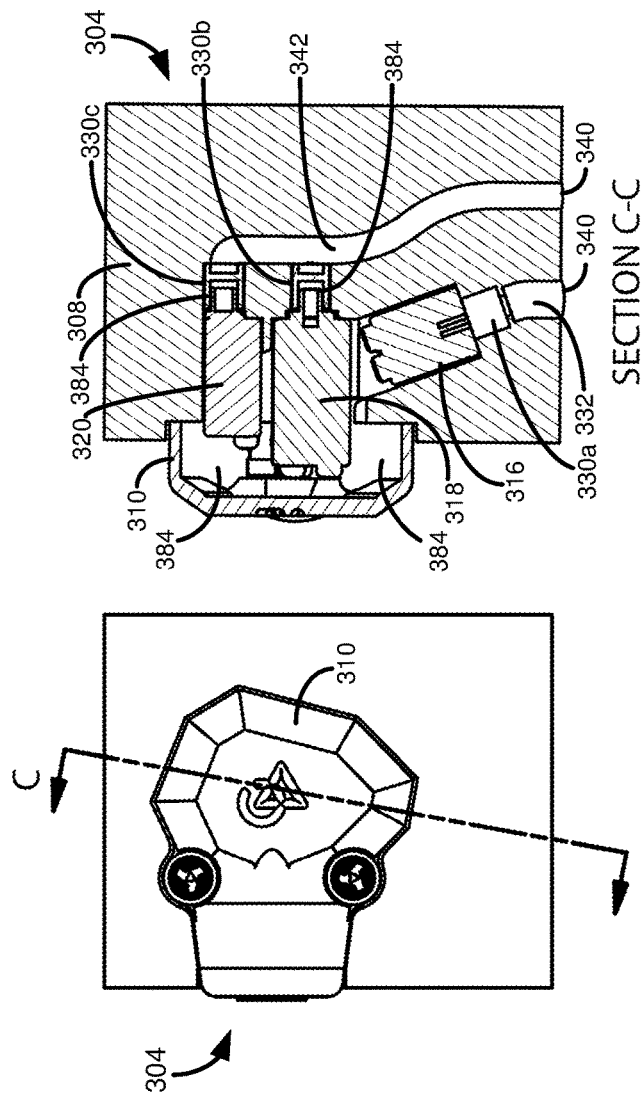
FIG. 3F
FIG. 3E

EARPHONE WITH SOLID BODY

CROSS REFERENCE TO RELATED APPLICATIONS

This application is a continuation of U.S. patent application Ser. No. 16/532,316, filed on Aug. 5, 2019, which is hereby incorporated herein by reference.

FIELD

The present disclosure relates to earphones and methods of their design. Particular embodiments provide solid earphone bodies that include negative spaces for acoustic drivers, sound modifying or transmitting components, or both.

BACKGROUND

The design and fabrication of electronic devices to be used in small operating environments can be challenging. For example, earphones are required to include drivers and various sound channels in a very small space—particularly for in-ear earphones. Tradeoffs often arise between considerations such as sound quality, durability, and ease of manufacturing. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are embodiments of an earphone having a solid body, as well as embodiments of methods for designing and fabricating such earphones.

In some embodiments, a disclosed earphone includes a solid body. A first mounting recess is formed in a first end of the earphone body. A first acoustic driver is disposed within the first mounting recess. At least one sound bore is formed in the solid earphone body and fluidly communicates with the first mounting recess and a first exit port formed at a second end of the earphone body. The second end of the earphone body is configured to be placed in an ear canal of a user.

In a particular embodiment, the solid earphone body can include additional features, such as a sound chamber formed in the solid earphone body and in fluid communication with the at least a first sound bore.

In another embodiment, a second mounting recess is formed in the first end of the earphone body. A second acoustic driver is disposed in the second mounting recess. At least a second sound bore is formed in the earphone body and fluidly communicates with the second mounting recess and a second exit port formed at the second end of the earphone body. In another embodiment, the at least a second sound bore communicates with the second mounting recess and the at least a first sound bore. A vent can be formed in the earphone body. When a cap is included, the vent can communicate with a vent formed in the cap.

Embodiments of a disclosed earphone can be tubeless. For example, in such embodiments, tubes do not form part of a connection pathway between the first mounting recess and the first exit port.

In further embodiments, a disclosed earphone includes a solid earphone body. A mounting recess is formed in a first end of the earphone body. A first acoustic driver is disposed in the mounting recess. A cap covers the mounting recess.

In a disclosed method of manufacturing an earphone, a virtual model of at least one physical earphone component and a virtual model of at least a first sound bore are created. A first virtual model of an earphone body is created. The virtual model of the at least one physical earphone component and the virtual model of the at least a first sound bore are positioned at least partially within the virtual model of the earphone body. One or more negative spaces are defined in the virtual model of the earphone body, corresponding to the virtual model of the at least one physical earphone component and the virtual model of the at least a first sound bore. The defining creates a second virtual model of the earphone body.

In an embodiment, the method includes creating a solid earphone body using the second virtual model of the earphone body, such as by injection molding or 3D printing. The at least one physical earphone component can be positioned within a recess in the solid earphone body, where the recess corresponds to a portion of the negative space of the second virtual model of the earphone body corresponding to at least a portion of the virtual model of the at least a first earphone component. A cap can be placed over the recess.

The manufacturing method, in an embodiment, can include obtaining a representation of a user's ear. The representation can be converted to at least a portion of the first virtual model of the earphone body.

In another embodiment, the virtual model of the at least one physical earphone component can be stored. The stored virtual model of the at least one physical earphone component can be made available for selection during the design of another earphone body.

The foregoing and other objects, features, and advantages of the invention will become more apparent from the following detailed description, which proceeds with reference to the accompanying figures.

BRIEF DESCRIPTION OF THE DRAWINGS

FIG. 2C is a perspective view of the representation of negative space shown in FIG. 2B.

FIG. 2D is a top plan view of the representation of negative space shown in FIG. 2B.

FIG. 2E is a side view of the earphone body and cap shown in FIG. 2B.

FIG. 2F is a cross-sectional view taken along line C-C of FIG. 2E.

FIG. 3A is a cross-sectional view of an earphone having an earphone body and a cap, where the earphone includes a plurality of balanced armature drivers, a plurality of sound bores, and a plurality of sound chambers.

FIG. 3B is a perspective, exploded view of the earphone of FIG. 3A, including showing a representation of negative space corresponding to the balanced armature drivers, sound bores, and sound chamber.

FIG. 3C is a perspective view of the representation of negative space shown in FIG. 3B.

FIG. 3D is a top plan view of the representation of negative space shown in FIG. 3B.

FIG. 3E is a side view of the earphone body and cap shown in FIG. 3B.

FIG. 3F is a cross-sectional view taken along line C-C of FIG. 3E.

DETAILED DESCRIPTION

Overview

Figure 1A:
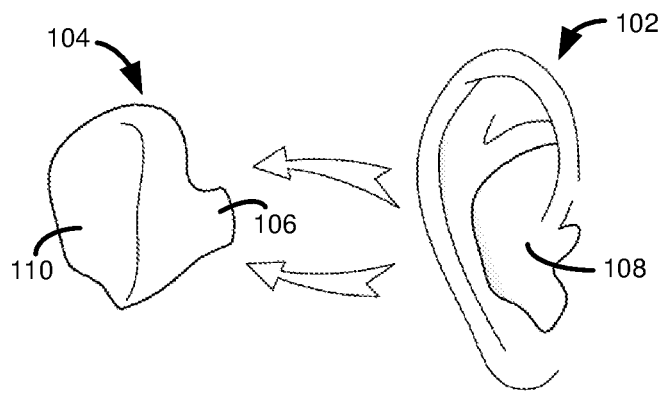
FIGS. 1A-1F are cross-sectional views of three-dimensional virtual models of an earphone body, earphone components, and sound modifying or transmitting features that can be included in an earphone, illustrating how such virtual models can be used in creating a model of an earphone body that can be used in manufacturing processes such as 3D printing or injection molding.

The design and fabrication of electronic devices to be used in small operating environments can be challenging. For example, earphones are required to include drivers and various sound channels in a very small space—particularly for in-ear earphones. Tradeoffs often arise between considerations such as sound quality, durability, and ease of manufacturing. Accordingly, room for improvement exists.

For example, earphones typically will include one or more drivers and one more channels for transmitting sound from the drivers to a user's ear. The channels are often in the form of fixed or flexible plastic tubes. Additional components that can be included in an earphone are electrical connections, such as to deliver power/audio signals to the drivers. Typically, all of these components are included in a shell or housing. In some cases, the housing can be a standardized form factor, and a portion of the earphone to be inserted into the user's ear (e.g., a "spout") can include a rubber tip to comfortably secure the earphone in the user's ear. In other cases, the housing can, at least in part, be custom molded to fit the ear of a particular user.

Housings are commonly provided having a plurality of separable portions, such as a portion of the housing that includes a tip to be inserted into the user's ear, and portion of the housing that will face outwardly, and be maintained within structures of the outer ear such as the tragus, antitragus, concha, and crus helix. During manufacturing, the drivers and other electronic components are typically secured in a cavity formed in a first portion of the housing. Clips or other securing means can be included in the first housing portion in order to secure the drivers or other components in place. A second housing portion can be secured over the open side of the first housing portion, such as using a snap or friction fit, including by inserting a gasket or other sealing means between coapting ends of the first and second housing portions. Other means of securing or sealing the two housing portions can be used, such as using adhesives or by fusing (e.g., thermally) a seam formed at the juncture of the housing portions.

While above-described methods of assembling earphones can be acceptable in some cases, such as to mass produce large quantities of standard earphones having acceptable sound quality, they can be problematic. For example, when one or more portions of an earphone housing include relatively larger cavities, the acoustic properties of the earphones can suffer. In addition, clips or other means used to secure drivers and other components within the housing can be prone to breakage, or to having the components slip outside of the clips, particularly if they are adjacent to open space within the cavity. Thus, earphones made using traditional techniques can suffer from durability issues, particularly if dropped or otherwise subjected to impact forces.

Similar issues can arise when tubes are used in an earphone. In a particular design, a portion of the housing may have interior passages that lead between an interior portion of the housing and an exterior portion of the housing. For example, a portion of the housing intended to be inserted into a user's ear canal can have one or more passages that extend from the inside of the housing to the exterior of the housing in order to transmit sound to the user. Tubes, including flexible tubes, may be used to couple the passage to a physical component, such as a driver, located in the cavity of the housing. These tubes can become disconnected or dislodged, which can affect sound quality, and more typically results in the earphones being unusable.

The components, and manufacturing techniques, typically used for earphones also can limit the sound reproduction properties of the earphones. For example, as mentioned, a large cavity may have undesirable acoustic properties, and tubes may be used to more precisely transmit sound from sound-generating components of the device to the user's ear. However, there are typically a limited number of properties of the tubes than can be modified in order to adjust their acoustic properties. Tube properties such as the diameter of the tube, the shape of the ends of the tube (used to attach to other structures of the earphones), and the material from which the tube is constructed may be modified to an extent. However, even potential changes to these properties can be constrained by limitations in the volume of the cavity, space taken by other components, and the length of the tube, and any curvature, needed to couple the different components. Moreover, the length of the tube, apart from perhaps one or both of the ends, typically has a substantially constant diameter, and the ability to bend or shape the tube can be limited.

The present disclosure provides an earphone that can address some or all of the problems in prior earphone designs, as well as methods of designing and manufacturing such earphones. One disclosed technology provides an earphone with a solid body that includes one or more negative spaces, or receptacles, for receiving hardware components of the earphone, such as a driver. A negative space for a hardware component can be configured to securely retain the hardware component within an assembled earphone. In some cases, the hardware component can be secured without the need for additional securing elements, such as adhesives or clips.

For example, if a hardware component has a plurality of sides, or edges (e.g., for a circle, edges can be considered points connected by a diameter of the circle), the negative space can be configured to receive at least one less than the plurality of sides, with material of the solid body contacting the received sides. At least one side of a hardware component is received by a negative space, and is contacted by surrounding material of the solid body. In further cases, at least two sides of component are received by the negative space, and is contacted by surrounding material of the solid body. Generally, a negative space for receiving a hardware component has an exterior end and an interior end, where the exterior end defines an opening for receiving the hardware component.

Another disclosed technology provides an earphone having a solid body defining negative spaces in the form of tunnels or through holes that connect earphone hardware components to an exterior surface of the earphone, such as for transmitting sound to a user. These types of tunnels or through holes are generally referred to herein as sound bores. The tunnels can also be used to interconnect hardware components, or acoustic features of the earphone, including features defined by negative spaces within a solid body of the earphone.

The tunnels can include (either integrally or being coupled to) one or more sound chambers, in the form of larger diameter negative spaces that are formed at intermediate sections of the tunnels, or at an end of a tunnel. Tunnels can also be present in the form of vents, such as vents used to adjust pressure in the earphone (including when worn by a user), or to adjust acoustic properties of the earphone.

As used herein, tunnels, including sound bores and vents, and sound chambers, are negative spaces with a solid earphone body. Tunnels are distinguished from tubes, where tubes consistent of a lumen defined by tube surface, where the outer surface of the tube is not surrounded by solid material. In particular examples, the disclosed tunnels extend through the body of the earphone and are surrounded by the solid portion of the earphone body for their entire length. However, in some cases, tubes can be inserted through all or a portion of the disclosed tunnels.

In a particular implementation, a disclosed earphone includes a generally solid body, defining negative spaces for hardware components, tunnels, or both, and forms a unitary surface. That is, the solid body is free of seams and is constructed as an integral, unitary mass of material. In particular examples, a solid earphone body, when drivers and other physical components have been installed into negative spaces formed in the earphone body, includes less than about 25% of unfilled space (e.g., non-solid material) compared with the total volume of the earphone body, such as less than about 20%, less than about 15%, less than about 10%, or less than about 5% of unfilled space. In particular examples, "about" means within 10% of the recited number. In further examples, an earphone body includes less than 25% of unfilled space, such as less than 20%, less than 15%, less than 10%, or less than 5%.

In further examples, a solid earphone body, when drivers and other physical components have been installed into negative spaces formed in the earphone body, is substantially free of unfilled space other than space associated with tuning elements (e.g., sound bores, vents, and sound chambers, or other negative-space features, where tuning elements more generally can include features such as acoustic damper). Substantially free of unfilled space, in this context, can mean less than about 15% of unfilled space compared with the total volume of the earphone body, such as less than about 12%, less than about 10%, less than about 8%, less than about 5%, or less than about 2% of unfilled space. In particular examples, "about" means within 10% of the recited number. In further examples, an earphone body includes less than 15%, 12%, 10%, 8%, 5%, or 2% of unfilled space.

The solid body can define an opening that provides access to negative spaces formed in the solid body. After hardware components are inserted into the earphone, a cap or plug can be placed over the opening. In particular implementations, compared with the overall surface area of the earphone body, the opening is less than about 25% of the total surface area, such as less than about 20%, less than about 15%, less than about 10%, or less than about 5% of the total surface area. In particular examples, "about" means within 10% of the recited number. In further examples, the opening is less than 25% of the total surface area of the earphone body, such as less than 20%, less than 15%, less than 10%, or less than 5% of the total surface area. However, in other implementations, the opening can be 20% or more of the total surface area of the earphone body.

According to a disclosed method, modeling software can be used to create negative spaces within a three-dimensional representation of a solid earphone body. The negative spaces can include tunnels or through holes, negative spaces for hardware, or a combination thereof, as described above. The solid earphone body can be a standardized body that will be mass produced, or can be a custom body that can adapted for the particular ear shape of an individual end user. Three-dimensional designs produced by modeling negative spaces in a solid earphone body can be fabricated into solid components using techniques such as 3D printing or injection molding.

Compared with prior approaches, the innovative disclosed earphones can be faster and easier to manufacture, in that fewer parts (e.g., tubes) may be needed, and installation of hardware components can be facilitated by having custom negative spaces (or voids) for receiving them. Having components secured within negative spaces, and/or fewer components, can make the earphones more robust, such as being better able to withstand both normal handling, and accidents involving sharp impacts, without internal parts becoming dislodged. Further, flexibility in placing internal earphone components, and the shape and position of tunnels, include the fabrication of chambers intermediate or at an end of one or more tunnels, can allow for better earphone performance, and the design of features that can improve sound quality.

One or more of these benefits can be achieved with a design process that it is easily adaptable, such as to provide different general earphone designs (e.g., different hardware and/or acoustic channel designs), or to facilitate adapting an earphone design to the ear shape of a particular user.

Method of Designing and Fabricating an Earphone with a Solid Body

FIGS. 1A-1F are a series of schematic drawings illustrating components of an earphone according to disclosed embodiments, and how an earphone can be designed and constructed. FIG. 1A illustrates an earphone body 104 having a first end 106, configured to be inserted into the ear canal 108 of a user's ear 102, and a second end 110, typically configured to be retained in the ear by physical structures of the user's outer ear.

In some cases, the earphone body 104 can be molded from, or otherwise represent, the anatomical features of an individual user's ear. For example, a mold or impression can be made of the user's ear, and converted to a three-dimension representation in a software design program, such as AUTODESK INVENTOR or FUSION 360 (both available from Autodesk, Inc., of San Rafael, Calif., and which can be used for the remaining steps associated with FIGS. 1A-1F). In other cases, a three-dimensional representation of the user's ear can be obtained by digitally scanning the user's ear. In further cases, the earphone body 104 can represent a standardized shape that is designed to satisfactorily fit any user, or at least a majority of users.

The first end 106 of the earphone body is typically shaped to securely, but comfortably, fit within the ear canal 108. In the case of earphone bodies 104 that are not customized, and intended to be used with many different users, the first end 106 can be covered with a tip, typically of rubber or another elastomer, that helps secure the earphone body 104 within the ear, while maintaining user comfort. In addition to helping secure the earphone body 104 in position, a secure fit with the ear canal 108, either through custom fitting or tips, can help improve the sound quality of the earphone, such as by prevent leakage of sound outside the earphone body, and helping reduce the intrusion of external sounds into the user's ear.

In a similar manner, the second end 110 is typically configured to help secure the earphone body 104 in position by nestling between, or wedging against, natural anatomic structures of the outer ear. Custom molded earphones can include a second end 110 that is also shaped to mate with native ear anatomy of a particular user. Mass produced, or general purpose, earphones can have a second end 110 that is shaped to mate with a variety of ear shapes.

Figure 1B:
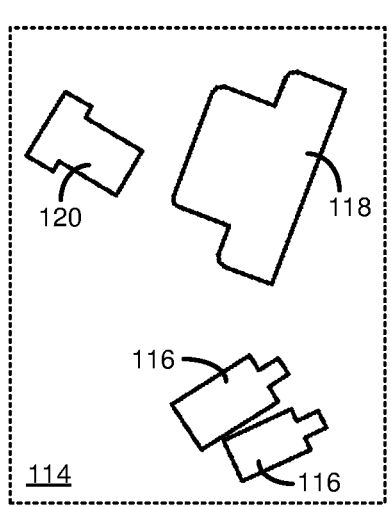

FIG. 1B illustrates outline representations of various hardware components 114 that can be used in an earphone. The outline representations can be two or three dimensional representations of physical hardware components that will be used in an earphone. In some cases, the outline representations can be obtained by scanning the actual hardware components. In other cases, the outline representations can be manually created, and can approximate the actual shape of the physical components. For example, many hardware components 114 are rectangular, or include rectangular portions, or are circular, or include circular portions, that are easily created using modelling software.

The hardware components 114 can include sound drivers (i.e., acoustic drivers), such as balanced armature drivers 116 and a dynamic driver 118. Hardware components 114 can further include a cable socket 120, which can be used to deliver electrical signals to the drivers 116, 118, to power the drivers and produce sound to be rendered to a user.

Figure 1C:
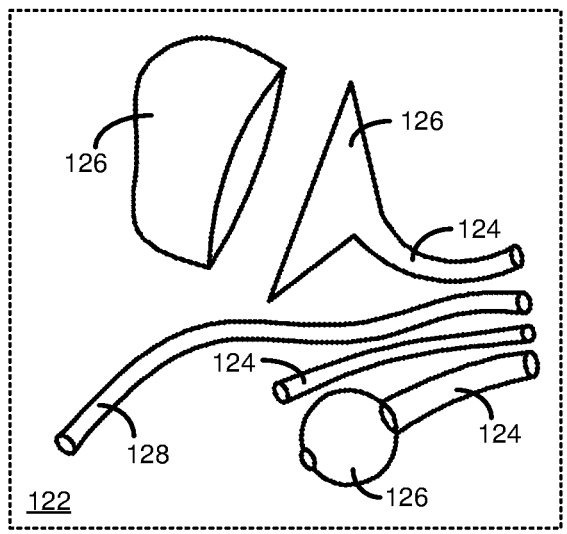

FIG. 1C illustrates outline representations of sound modifying and transmission structures 122 that can be included in an earphone, and can be represented in design software. The sound modifying structures and transmission structures 122 can include sound bores 124, acoustic chambers 126, and vents 128. Sound bores 124 can transmit sound from the drivers 116, 118 to the user's ear. Vents 128 can be used to allow air movement within the user's ear, or within the earphone, which can be used to tune the acoustic properties perceived by the user (e.g., to enhance bass). Similarly, acoustic chambers 126 can be used to condition sound to be transmitted to a user, and improve overall audio quality. Note that the acoustic chambers 126 can be a significant advantage of disclosed technologies, as typical methods of earphone production are not capable of incorporating acoustic chambers into an earphone body.

The representations of the hardware components 114 and the representations of the sound modifying and transmission structures 122 in modelling software can be used to generate negative spaces. That is, the representations themselves can indicate negative space, or can represent positive structures that are subtracted from a model (such as a model of the earphone body 104) in order to create negative spaces in the model.

Figure 1D:
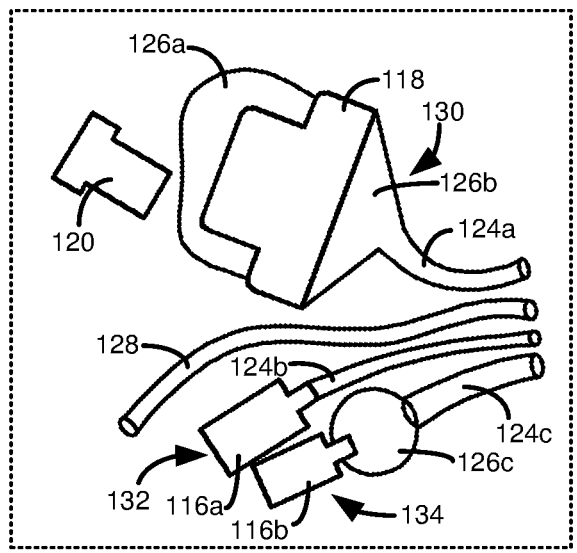

FIG. 1D illustrates how the representations of the hardware components 114 and the sound modifying and transmission structures 122 can be arranged to form subassemblies, such as in a modelling software program. As shown, a subassembly 130 is formed by placing the dynamic driver 118 intermediate an acoustic chamber 126a and an acoustic chamber 126b, where the acoustic chamber 126b communicates with a sound bore 124a. Note that the end of the sound chamber 126b proximate the dynamic driver 118 has an enlarged opening, like a funnel, in order to capture sound transmitted by the dynamic driver, but tapers to a significantly narrower diameter in adjoining/transitioning into the sound bore 124a, which then passes though the earphone body 104 towards the first end 106.

A subassembly 132 includes a balanced armature driver 116a proximate a sound bore 124b, while a subassembly 134 include a balanced armature driver 116b proximate a sound chamber 126c, which in turn is proximate an end of a sound bore 124c. Note that while sound bores 124 and sound chambers 126 are shown as separate components, they can be treated (including being modelled) as unitary components. For example, in a solid body of a physical earphone, a sound bore may have an acoustic chamber at an end, or at an intermediate portion. In a corresponding model from which the physical earphone was created, the combined sound bore/acoustic chamber can be represented as an acoustic chamber overlying a sound bore, or a portion of the sound bore can be manipulated (e.g. stretched, or otherwise having a larger diameter than a remainder of the sound bore) to represent the acoustic chamber. The two modelling approaches can be considered equivalent from the standpoint of the physical solid earphone body.

In some cases, the virtual representations of one or more of the hardware components 114, the sound modifying and transmission structures 122, or the subassemblies 134 can be stored. For example, a variety of earphone models, either custom or standardized, can be created from different combinations of hardware components 114. At least many of the sound modifying and transmission structures 122 can also be standardized, or at least substantially standardized. That is, for example, the length and conformation of a particular sound bore 124 can be reasonably consistent between earphone models or custom versions of a specific model, with minor changes to length and/or orientation being made to adapt to changes in the size or shape of the solid earphone body 104 or the particular hardware components 114 being used, and the particular location and orientation thereof.

Figure 1E:
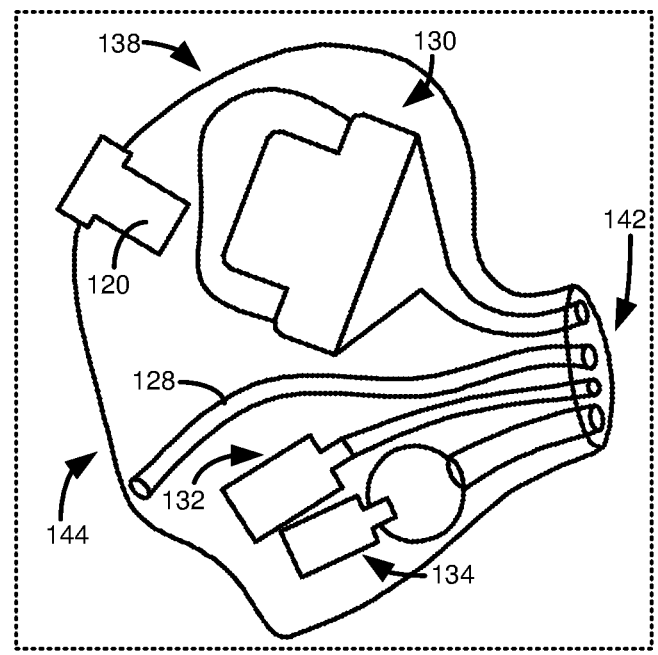

FIG. 1E illustrates how the subassemblies 130, 132, 134 can be incorporated into a virtual model 138 of an earphone body, such as the earphone body 104. The subassemblies 130, 132, 134 can be positioned within the model 138 in order to achieve desired acoustic properties, and to accommodate other hardware components of the earphones, such as the cable socket 120, and other sound modifying or transmitting features (e.g., sound bores, sound chambers, or vents), such as the vent 128. For example, the sound bores 124 and the vent 128 are positioned such that their ends extend to open at a first end 142 of the virtual model 138, corresponding to the first end 106 of the earphone body 104. The hardware components 114, including the drivers 116, 118 are placed towards a second end 144 of the virtual model 138, corresponding to the second end 110 of the earphone body 104, where there is a greater interior volume to house the components. The cable socket 120 is also placed at the second end 144 of the virtual model, to allow electrical connection with internal components of the earphone body, such as acoustic drivers.

Figure 1F:
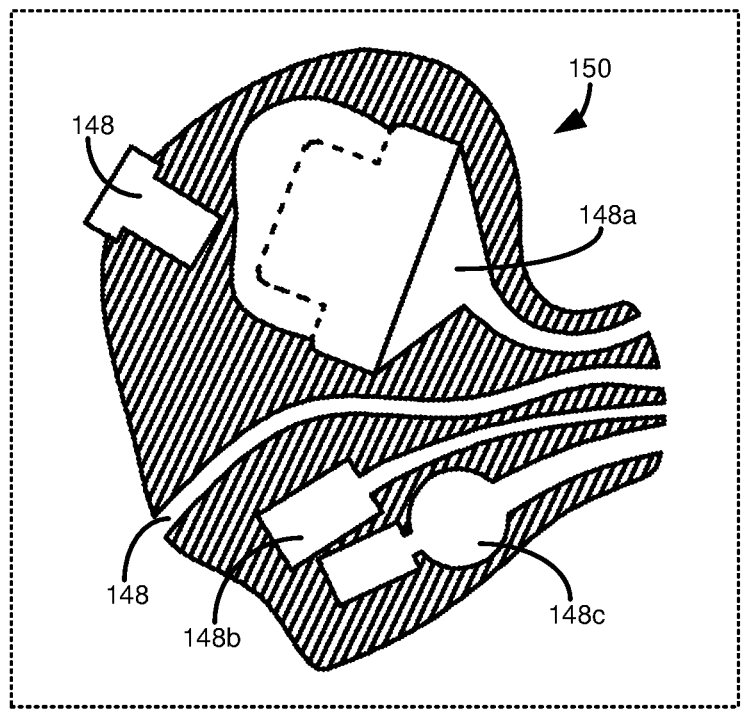

FIG. 1F illustrates a cross section of a solid earphone body 150 produced using the virtual model of FIG. 1E. The hardware components 114 and sound modifying and transmission structures 122 included in the virtual model 138 are represented as negative spaces 148 in the solid earphone body 150.

In FIG. 1F, some of the negative spaces are shown as connecting, which others are shown as disconnected/non-contiguous. For example, the entire negative spaces 148a-148c for each subassembly 130, 132, 134 is shown as individually contiguous, but each of those negative spaces is shown as disconnected from the other. At least a portion of the negative spaces 148 may be disconnected, but, in practice, at least a portion of the negative spaces can be connected, but such connection is not shown in the particular cross section of FIG. 1F.

In some cases, two or more negative spaces in an earphone body can be disconnected. However, it can be beneficial to have the negative spaces for multiple components be connected. In particular, it can be beneficial to have negative spaces 148 corresponding to at least a portion of the hardware component 114 connected, as this can facilitate manufacturing of an earphone, as will be further described.

In practice, a user can design an earphone by creating or loading (e.g., selecting saved components from a menu) a virtual model 138 of an earphone, the virtual models of the desired hardware components 114, and the virtual models of the sound modifying and transmission components 122, including as incorporated in subassemblies (e.g., subassemblies 130, 132, 134). After the hardware components 114 and sound modifying and transmission components 122 have been appropriately positioned, the components can optionally be converted to negative representations (i.e., if the representations were not already negative representations) such that the volume for these components is subtracted from portion of the virtual model 138 representing solid material, thus defining negative spaces (e.g., negative spaces 148) corresponding to the components. An earphone according to the model can then be fabricated, such as by injection molding or 3D printing.

However, various modifications can be made to the above-method. For example, an earphone design or manufacturing process can include carrying out one or more, including all, of the steps associated with FIG. 1B, FIG. 1C, or FIG. 1D. After the virtual models of the relevant hardware components and/or sound modifying or transmission components have been created, including as parts of subassemblies, a virtual model of an earphone body can be created, as described with respect to FIG. 1A, and the process can then continue as described with respect to FIG. 1E and FIG. 1F.

For example, in many cases, it can be beneficial to first design subassemblies of an earphone to achieve desired performance/acoustic properties, including a selection of hardware components and tuning elements. That particular collection of components and tuning elements can then be incorporated into one or more earphone body shapes as desired. In some cases, minor adjustments, such as to the length and conformation of tuning elements, can be made to adapt a particular earphone design to a particular body shape.

Example Solid Body Earphones

Figure 4:
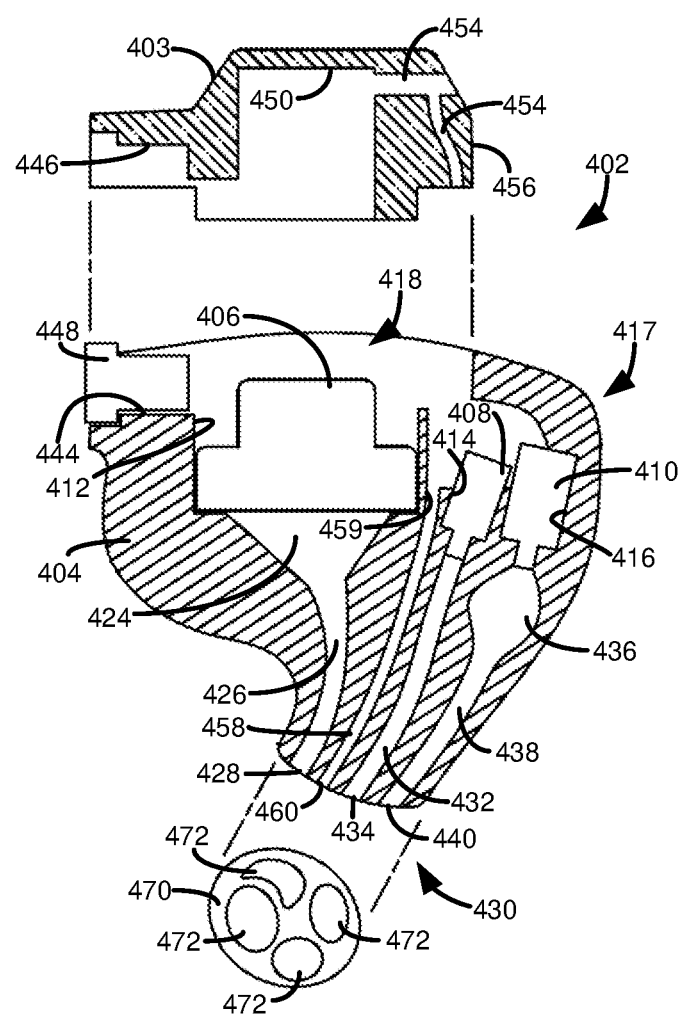
FIG. 4 is a cross-sectional view of an earphone having an earphone body and a cap, where the earphone includes a dynamic driver, a plurality of balanced armature drivers, a plurality of sound bores, a plurality of sound chambers, and a vent.

FIGS. 2-4 illustrate different earphones designs that can be produced using the technique described in conjunction with FIGS. 1A-1F. The different earphones designs can represent designs that allow different acoustic properties to be achieved, as well as earphones meeting different price/performance objectives.

Figure 2B:
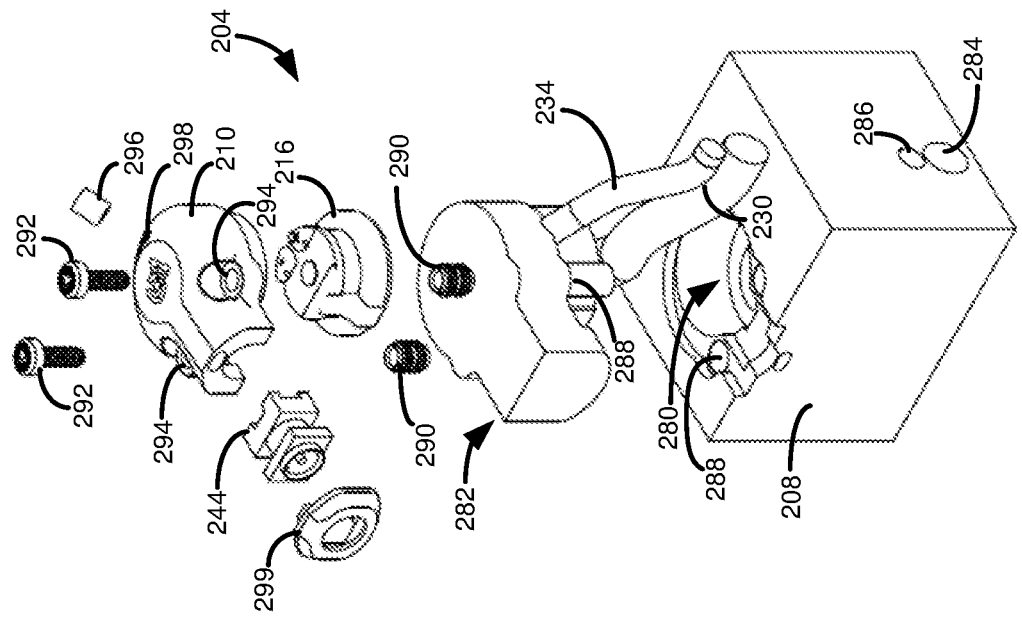
FIG. 2B is a perspective, exploded view of the earphone of FIG. 2A, including showing a representation of negative space corresponding to the dynamic driver, sound bore, and vent.
Figure 2A:
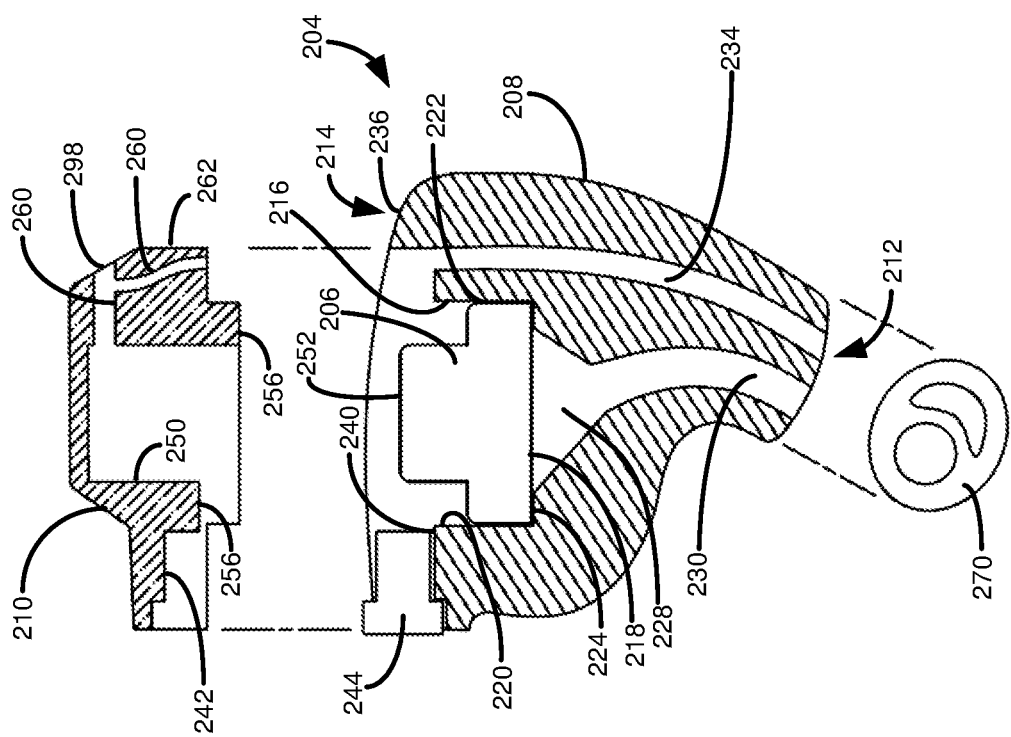
FIG. 2A is a cross-sectional view of an earphone having an earphone body and a cap, where the earphone includes a dynamic driver, a sound bore, and a vent.

FIG. 2A illustrates a cross-sectional view of an earphone 204 that includes a single dynamic driver 206. The earphone 204 is formed from a unitary body 208, onto which a cap 210 can be placed. Both the body 208 and the cap 210 can incorporate negative spaces, both to house hardware components and to allow for sound modification or transmission.

The body 208 includes a first end 212 that is configured to be placed in the user's ear. The body 208 includes a second end 214, where the second end is completed when the cap 210 is inserted onto the body 208.

The body 208 is constructed from a solid material, such as plastic or metal (or combinations thereof), or from ceramics, including zirconia ceramics. Various negative spaces are formed in the body 208, including a mounting section 216 configured to receive the dynamic driver 206. A sound-transmitting end 218 of the dynamic driver 206 can abut a bottom portion of the mounting section 216, where the mounting section can be in the form of a well having a wider section 220 that abuts the lateral sides 222 of the dynamic driver, and a narrower section 224 that abuts the sound transmitting end 218 of the dynamic driver.

The bottom of the mounting section 216 opens into a sound chamber 228 that in turn is connected to a main sound bore 230 that passes through the body 208 to an exit port 284 at the first end 212. The sound chamber 228 and the main sound bore 230 represent negative spaces in the body 208, and can be formed during production of the body, such via an injection molding or by 3D printing (including when plastics or ceramics are used for the body 208). The body 208 also includes a pressure relief vent 234 that extends from an upper surface 236 of the body to an exit port 286 at the first end 212.

The cap 210 and the body 208 can include mating negative spaces 240, 242 for receiving a cable socket 244. Cables, or other wiring, not shown, can be connected to the cable socket 244, which in turn is electrically coupled (e.g., via wires) to the dynamic driver 206. The cap 210 further defines a negative space in the form of a recess 250 for receiving an upper end 252 of the dynamic driver. The upper end 252 of the dynamic driver 206 can have a narrower cross sectional width than the sound transmitting end 218. The side walls 256 of the recess 250 can be configured to be inserted into a gap between the walls of the mounting section 216 and the lateral sides of the upper end of the dynamic driver 206.

The cap 210 can include a vent bore 260 that extends to a lateral side 262 of the cap, and which can mate withe the pressure relief vent 234. The vent bore 260 can also extend to, and open into, the recess 250 of the cap 210.

An earphone 204 can be constructed by arranging representations of the dynamic driver 206, cable socket 244, sound chamber 228, main sound bore 230, and relief vent 234 in a virtual model of the earphone. The representations can be negative space representations, or can be subtracted from a volume of the virtual model of the earphone 204 to create corresponding negative spaces. The cap 210 can be created in a similar manner Once the models of body 208 and the cap 210 have been created, they can be used to create the physical body and cap, such as via 3D printing or injection molding.

The dynamic driver 206 can be inserted into the mounting section 216, and electrically connected to the cable socket 244. The cap 210 can then be placed over the dynamic driver 206 and the cable socket 244, such that the sides 256 of the recess 250 are inserted around the upper end 252 of the dynamic driver. The cap 210 can be further secured by using an adhesive (such as a rubberized adhesive), or other fastening means, such as screws. A faceplate 270 can be coupled to the first end 212 of the body 208.

FIG. 2B presents an exploded view of the earphone 204. The body 208 is shown in a generalized fashion (e.g., a cube), as the disclosed technology is not necessarily limited to any particular body shape. The body 208 is shown as including a negative space 280. The negative space 280 can be represented in a virtual model as negative space 282. That is, removing negative space 282 from a virtual model of a solid earphone body results in the earphone body 208 having the negative space 280. As described above, the negative space 282 can include the sound chamber 228, the sound bore 230, the vent 234, the dynamic driver 206, and at least a portion of the cable socket 244. Additional views of the negative space 282 are provided in FIGS. 2C and 2D.

In FIG. 2B, the body 208 is shown with the exit port 284 for the sound bore 230 and the exit port 286 for the vent 234. The negative space representation 282 shows wells 288 for receiving threaded screw inserts 290, which can receive screws 292 inserted through openings 294 in the cap 210.

An acoustic damper 296 can be inserted within the vent bore 260 (e.g., the vertical portion that mates with the vent 234). An end cap 299, having an opening 298 to the vent bore 260, can be placed over the cable socket 244, and secured to the cap 210.

FIG. 2E illustrates a side view of the body 208 and the cap 210, while FIG. 2F illustrates a cross-sectional view of the body and cap taken along line C-C of FIG. 2E. In FIG. 2E, the driver 206 is shown within the mounting section 216.

FIG. 3 illustrates an earphone 304 having a plurality of balanced armature drivers 316, 318, 320 instead of the dynamic driver 206 of FIG. 2A. The earphone 304 includes a body 308 and a cap 310. The body 308 is constructed from a solid material, such as plastic or metal (or combinations thereof), or from ceramics, including zirconia ceramics, and can be formed using methods such as 3D printing (including when the body is made from plastic or ceramic materials) or injection molding.

The body 308 defines a plurality of negative spaces, in the form of recessed portions 322, 324, 326 that are dimensioned to receive and secure first longitudinal ends of the respective balanced armature drivers 316, 318, 320. The recessed portions 322, 324, 326 can result from modeling the first longitudinal ends of the balanced armature drivers 316, 318, 320 as negative space, or subtracting representations of the balanced armature drivers from a virtual model of the body 308.

The balanced armature drives 316, 318, 320 are positioned next to (e.g., abutting) sound modification or transmission features formed as negative spaces in the body 308. In particular, each balanced armature driver 316, 318, 320 is positioned next to a sound chamber 330 (respectively, to each balanced armature driver, sound chambers 330a, 330b, 330c). The sound chambers 330 can represent a larger diameter space compared with respective sound bores 332, 334, 336 that extend from lower ends (e.g., towards a first end 338 of the body 308, which end is configured to be placed in a user's ear) of the respective sound chamber, through the body 308 to the first end and a respective exit port 340. The sound chambers 330 can be used, in some cases, to cause resonance in acoustic waves produced by the balanced armature drivers 316, 318, 320. For example, sound chamber 330a can function as a Helmholtz resonator.

Note that the sound bore 334 and the sound bore 336 intersect to end at a common sound bore 342, having an exit port 340. Coupling sound bores 334 and 336 can be used to adjust to audio qualities of the earphone 304, including to adjust resonance properties, in a similar manner as the sound chambers 330.

A faceplate 348 can be placed over the first end 338, where the faceplate has openings 350 configured to be located over the exit ports 340.

The cap 310 defines a recess 352 that is configured to fit over the second longitudinal ends of the balanced armature drivers 316, 318, 320, which extends towards a second end 354 of the body 308. The cap 310 and the body 308 can include mating negative spaces 356, 358 for receiving a cable socket 360. Cables, or other wiring, not shown, can be connected to the cable socket 360, which in turn is electrically coupled (e.g., via wires) to the balanced armature drivers 316, 318, 320.

An earphone 304 can be constructed by arranging representations of the balanced armature drives 316, 318, 320, cable socket 360, sound bores 332, 334, 336 and sound chambers 330 in a virtual model of the earphone. The representations can be negative space representations, or can be subtracted from a volume of the virtual model of the earphone 304 (e.g., the body 308, and optionally the cap 310) to create corresponding negative spaces. The cap 310 can be created in a similar manner Once the models of body 308 and the cap 310 have been created, they can be used to create the physical body and cap, such as via 3D printing or injection molding.

The balanced armature drivers 316, 318, 320 can be inserted into their respective recesses 322, 324, 326, and coupled to the cable socket 360. The cap 310 can then be placed over the balanced armature drivers 316, 318, 320 and the cable socket 360, such that the upper longitudinal ends of the balanced armature drivers are within the recess 352. The cap 310 can be further secured by using an adhesive, or other fastening means, such as screws. The faceplate 348 can be coupled to the first end 338 of the body 308.

FIG. 3B presents an exploded view of the earphone 304. The body 308 is shown in a generalized fashion (e.g., a cube), as the disclosed technology is not necessarily limited to any particular body shape. The body 308 is shown as including a negative space 370. The negative space 370 can be represented in a virtual model as negative space 372. That is, removing negative space 372 from a virtual model of a solid earphone body results in the earphone body 308 having the negative space 370. As described above, the negative space 372 can include the sound bores 332, 334, 336, the sound chambers 330, the balanced armature drivers 316, 318, 320, and at least a portion of the cable socket 360. Additional views of the negative space 372 are provided in FIGS. 3C and 3D.

In FIG. 3B, the negative space representation 372 shows wells 376 for receiving threaded screw inserts 378, which can receive screws 380 inserted through openings 382 in the cap 310. Acoustic dampers 384 can be inserted in the sound chambers 330b, 330c, as best shown in FIG. 3F. An end cap 390 can be placed over the cable socket 360, and secured to the cap 310.

In general, it is noted that the acoustic properties of a particular earphone can be tuned by incorporating different tuning elements into an earphone body (including different combinations of tuning elements, and tuning elements properties), and by adjusting the properties of the tuning elements (e.g., the length, diameter, and conformation of sound bores and vents, the shape and size of sound chambers). Combinations of tuning elements can include placing acoustic dampers proximate other tuning elements, such as sound bores or vents, including placing acoustic dampers within the path/length of a sound bore or vent.

FIG. 3E illustrates a side view of the body 308 and cap 310, while FIG. 3F illustrates a cross-sectional view of the body and cap taken along line C-C of FIG. 3E. In FIG. 3E, the balanced armature drivers 316, 318, 320 are shown within their respective recesses 322, 324, 326.

FIG. 4 illustrates an earphone 402 that includes a dynamic driver 406 and two balanced armature drivers 408, 410. The earphone 402 can be formed from a cap 403 and a body 404. The body 404 is constructed from a solid material, such as plastic or metal (or combinations thereof), or from ceramics, including zirconia ceramics, and can be formed using methods such as 3D printing (including when the body is made from plastic or ceramic materials) or injection molding.

The body 404 can have negative spaces, in the form of recesses 412, 414, 416, formed in a second end 417 of the body, for receiving the dynamic driver 406 and the balanced armature drivers 408, 410, respectively, that are accessible through an opening 418 to the body 404. The recess 412, for the dynamic driver 406, can be at least generally similar to the recess 216 of FIG. 2. The recesses 414, 416, for the balanced armature drivers 408, 410, can be at least generally similar to the recesses 324, 326 of FIG. 3.

The body 404 can have negative spaces, in the form of recesses 412, 414, 416, for receiving the dynamic driver 406 and the balanced armature drivers 408, 410, respectively. The recess 412, for the dynamic driver 406, can be at least generally similar to the recess 216 of FIG. 2. The recesses 414, 416, for the balanced armature drivers 408, 410, can be at least generally similar to the recesses 324, 326 of FIG. 3.

The recess 412 communicates with a funnel-shaped sound chamber 424, which in turn communicates with a sound bore 426 that passes through the body 404 to an exit port 428 at a first end 430 of the body. The balanced armature driver 408 communicates with a sound bore 432 that passes through the body 404 to an exit port 434, while the balanced armature driver 410 communicates with a sound chamber 436 that in turn communicates with a sound bore 438 that passes through the body to an exit port 440.

The cap 403 and the body 404 can include mating negative spaces 446, 444 for receiving a cable socket 448. Cables, or other wiring, not shown, can be connected to the cable socket 448, which in turn is electrically coupled (e.g., via wires) to the dynamic driver 406 and the balanced armature drivers 408, 410.

The cap 403 further defines a negative space in the form of a recess 450 for receiving an upper end of the dynamic driver 406, in similar manner as described for the cap 210 of FIG. 2. The cap 403 can include a vent bore 454 that extends to a lateral side 456 of the cap 403, and which can mate with a pressure relief vent 458 that is formed in the body 404 and extends through the body from an opening 459 to an exit port 460. The vent bore 454 can also extend to, and open into, the recess 450 of the cap 403.

An earphone 402 can be constructed by arranging representations of the dynamic driver 406, balanced armature drivers 408, 410, cable socket 448, sound bores 426, 432, 438, sound chambers 424, 436, and relief vent 458 in a virtual model of the earphone. The representations can be negative space representations, or can be subtracted from a volume of the virtual model of the earphone 402 to create corresponding negative spaces. The cap 403 can be created in a similar manner. Once the models of body 404 and the cap 403 have been created, they can be used to create the physical body and cap, such as via 3D printing or injection molding.

The dynamic driver 406 can be inserted into the mounting recess 412, and electrically connected to the cable socket 448. The balanced armature drivers 408, 410 can be inserted into their respective mounting recesses 414, 416 and electrically connected to the cable socket 448. The cap 403 can then be placed over the dynamic driver 406 and the cable socket 448, such that the sides of the recess 450 surround the upper end of the dynamic driver. The cap 403 can be further secured by using an adhesive, or other fastening means, such as screws. A faceplate 470 can be coupled to the first end 430 of the body 404, and can include apertures 472 for communicating with the exit ports 428, 434, 440, 460.

In some implementations, a spout (such as an elongated, optionally tapered structure) configured to be placed into a user's ear, including when covered by a tip (e.g., a plastic or rubber material), can be used instead of, or in addition to, the faceplate 470. The spout can be integrally formed at the first end 430 of the earphone body 404, or can be coupled to the first end (e.g., by snap or friction fit, thermal means, such as welding, or using an adhesive). Although described with respect to the earphone 402, a spout may also be included in other earphone designs, including the earphone 204 or the earphone 304.

Example Manufacturing Method

Figure 5:
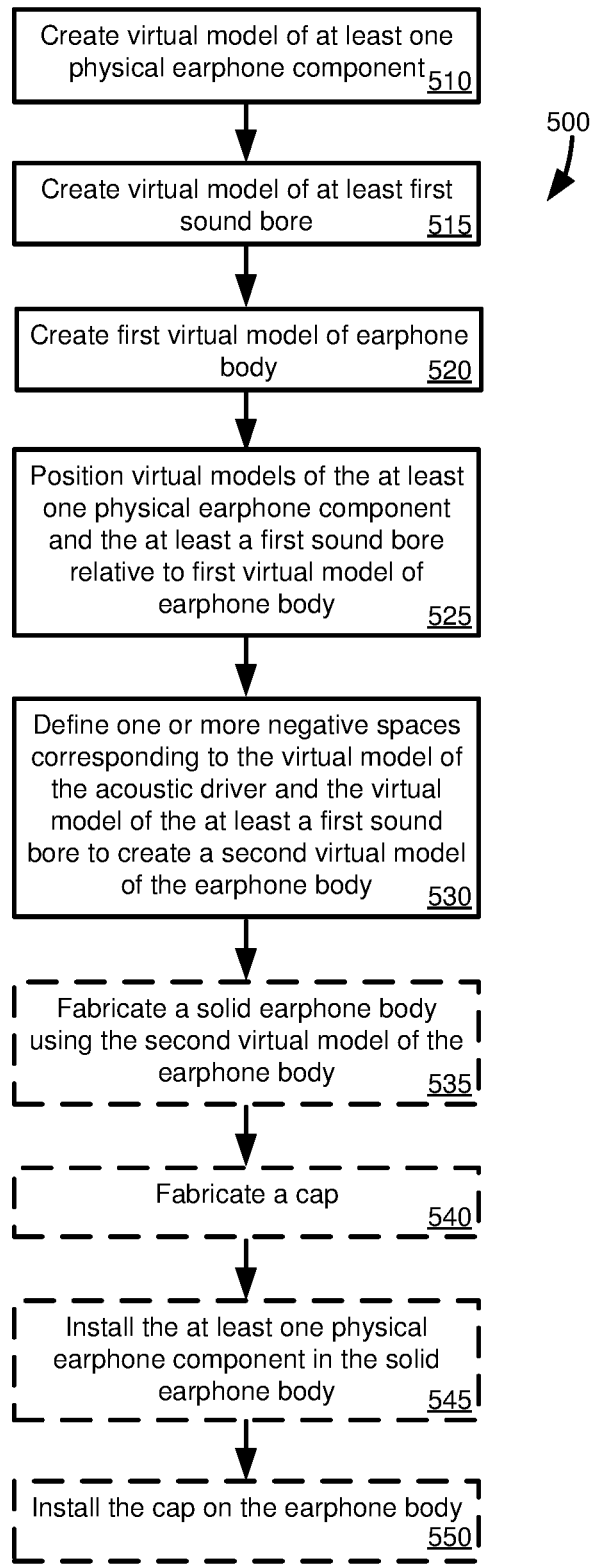
FIG. 5 is a flowchart of an example method for manufacturing an earphone having a solid body.

FIG. 5 presents a flowchart of an example method 500 for manufacturing an earphone. At 510, a virtual model of at least one physical earphone component is created. The at least one physical earphone component can be, for example, an acoustic driver (such as a balanced armature driver or a dynamic driver), a cable socket, screw mounts/inserts, or acoustic dampers. A virtual model of at least a first sound bore is created at 515. At 520, a first virtual model of an earphone body is created, such as from a mold of a user's ear, from a 3D scan of a user's ear, from a 3D scan of an earphone body, or by another method. The virtual model of the at least one physical earphone component the virtual model of the at least a first sound bore are positioned, at 525, at least partially within the first virtual model of the earphone body. At 530, one or more negative spaces are defined in the first virtual model of the earphone body corresponding to the virtual model of the at least one physical earphone component and the virtual model of the at least a first sound bore to create a second virtual model of the earphone body.

The method 500 can optionally include one or more additional steps. For example, at 535, a solid earphone body can be fabricated from the second virtual model of the earphone body, such by 3D printing or injection molding. A cap, to be placed over at least part of a portion of the earphone body, can be fabricated at 540, such as by machining, molding, or 3D printing. At 545, the at least one physical earphone component can be installed in the earphone body, such as in a recess corresponding to a negative space in the virtual model corresponding to the virtual model of the at least one physical earphone component. The cap can be installed on the earphone body at 550.

General Conderations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present, or problems be solved.

Features, integers, characteristics, compounds, chemical moieties, or groups described in conjunction with a particular aspect, embodiment or example of the invention are to be understood to be applicable to any other aspect, embodiment or example described herein unless incompatible therewith. All of the features disclosed in this specification (including any accompanying claims, abstract, and drawings), and/or all of the steps of any method or process so disclosed, may be combined in any combination, except combinations where at least some of such features and/or steps are mutually exclusive. The present disclosure is not restricted to the details of any foregoing embodiments. The present disclosure extends to any novel one, or any novel combination, of the features disclosed in this specification (including any accompanying claims, abstract, and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms "a", "an" and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A," "B," "C," "A and B," "A and C," "B and C" or "A, B and C."

As used herein, the term "coupled" generally means physically coupled or linked and does not exclude the presence of intermediate elements between the coupled items absent specific contrary language. "Directly coupled" refers to two components that are directly physically coupled or linked, and excludes the presence of intermediate elements. As used herein, the terms "integrally formed" and "unitary construction" refer to a construction that does not include any welds, fasteners, or other means for securing separately formed pieces of material to each other, or features resulting from securing separately formed pieces, such as joints, seams, or discontinuities of shape or material.

As used herein, "in fluid communication" means that two components are coupled via a common transmission medium, such as a sound transmission medium (e.g., air). Two components can be referred to as in "direct fluid communication" when a transmission medium can flow directly between the two components, such as without passing through intermediate spaces, such as a tube.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. An earphone comprising:
a solid earphone body;
a first mounting recess formed in a second end of the solid earphone body;
a first acoustic driver disposed in the first mounting recess;
at least a first sound bore formed in the solid earphone body and fluidly communicating with the first mounting recess and a first exit port formed at a first end of the solid earphone body, the first end configured to be placed in an ear canal of a user;
a second mounting recess formed in the second end of the solid earphone body;
a second acoustic driver disposed in the second mounting recess;
at least a second sound bore formed in the solid earphone body and fluidly communicating with the second mounting recess and a second exit port formed at the first end of the solid earphone body, wherein the at least a second sound bore is fluidly isolated from the at least a first sound bore;
a third mounting recess formed in the second end of the solid earphone body;
a third acoustic driver disposed in the third mounting recess;
at least a third sound bore formed in the solid earphone body and fluidly communicating with the third mounting recess and a third exit port formed at the first end of the solid earphone body, wherein the at least a third sound bore is fluidly isolated from the at least a first sound bore and the at least a second sound bore;
a pressure relief vent formed in the solid earphone body, the pressure relief vent fluidly isolated from the at least a first sound bore, the at least a second sound bore, and the at least a third sound bore and extending from the second end of the solid earphone body to the first end of the solid earphone body, the pressure relief vent having a first opening to an exterior surface of the first end of the solid earphone body and a second opening to an exterior surface of the second end of the solid earphone body;
a cap, the cap configured to mate with the solid earphone body; and
a vent bore formed in the cap and opening to an exterior surface of the cap, the vent bore configured to fluidly mate with the pressure relief vent of the solid earphone body when the cap is mated to the solid earphone body;
wherein the earphone comprises less than about 25% of unfilled space compared with a total volume of the solid earphone body, the solid earphone body defines an opening to provide access to negative spaces formed in the solid earphone body, the opening being less than about 25% of a total surface area of the solid earphone body.

2. The earphone of claim 1, further comprising a sound chamber formed in the solid earphone body and in fluid communication with the at least a first sound bore.

3. The earphone of claim 1, wherein the solid earphone body does not include tubes.

4. The earphone of claim 1, wherein the pressure relief vent and the at least a first sound bore are defined from material forming the solid earphone body.

5. The earphone of claim 1, further comprising a cable socket disposed at least partially between the cap and the solid earphone body.

6. The earphone of claim 1, wherein the first acoustic driver is not in fluid communication with a tube.

7. The earphone of claim 1, wherein the earphone, not including space associated with tuning elements and physical components within the solid earphone body, comprises less than about 10% of unfilled spaced compared with a total volume of the solid earphone body.

* * * * *